United States Patent
Wei et al.

(10) Patent No.: US 9,000,524 B2
(45) Date of Patent: Apr. 7, 2015

(54) METHOD AND APPARATUS FOR MODELING MULTI-TERMINAL MOS DEVICE FOR LVS AND PDK

(75) Inventors: Chau-Wen Wei, Hsin-Chu (TW); Cheng-Te Chang, Hsin-Chu (TW); Chin-yuan Huang, Hsin-Chu (TW); Chih Ming Yang, Hsin-Chu (TW); Yi-Kan Cheng, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 734 days.

(21) Appl. No.: 13/081,092

(22) Filed: Apr. 6, 2011

(65) Prior Publication Data

US 2012/0256271 A1    Oct. 11, 2012

(51) Int. Cl.
| | | |
|---|---|---|
| H01L 29/66 | (2006.01) | |
| H01L 27/088 | (2006.01) | |
| H01L 21/8234 | (2006.01) | |
| H01L 21/8238 | (2006.01) | |
| H01L 27/06 | (2006.01) | |
| H01L 27/02 | (2006.01) | |
| G06F 17/50 | (2006.01) | |

(52) U.S. Cl.
CPC ...... *H01L 27/088* (2013.01); *H01L 21/823493* (2013.01); *H01L 21/823892* (2013.01); *H01L 27/0207* (2013.01); *H01L 27/0629* (2013.01); *G06F 17/5036* (2013.01)

(58) Field of Classification Search
CPC .............. H01L 21/823892; H01L 21/823493
USPC .................................. 257/365, 371
See application file for complete search history.

(56) References Cited

U.S. PATENT DOCUMENTS

| | | | | |
|---|---|---|---|---|
| 5,148,255 A | * | 9/1992 | Nakazato et al. | 257/378 |
| 5,488,247 A | * | 1/1996 | Sakurai | 257/368 |
| 6,130,574 A | * | 10/2000 | Bloch et al. | 327/536 |
| 2004/0014268 A1 | * | 1/2004 | Ishibashi et al. | 438/200 |

* cited by examiner

*Primary Examiner* — Phat X Cao
(74) *Attorney, Agent, or Firm* — Slater & Matsil, L.L.P.

(57) ABSTRACT

An apparatus comprises two n-type metal oxide semiconductor (MOS) devices formed next to each other. Each n-type MOS device further includes a pair of face-to-face diodes formed in an isolation ring. A method of modeling the apparatus comprises reusing four-terminal MOS device models in standard cell libraries and combining the four-terminal MOS device model and the isolation ring model into a 4T MOS plus isolation ring model. The method of modeling the apparatus further comprises adding a dummy device between a body contact of the first n-type MOS device and a body contact of the second n-type MOS device.

13 Claims, 5 Drawing Sheets

METHOD AND APPARATUS FOR MODELING MULTI-TERMINAL MOS DEVICE FOR LVS AND PDK

BACKGROUND

A semiconductor foundry may provide standard cell libraries and design intellectual property (IP) blocks for integrated circuit (IC) designers. Standard cell libraries comprise a plurality of devices such as an inverter formed by a P-channel metal oxide semiconductor (PMOS) transistor and an N-channel metal oxide semiconductor (NMOS) transistor. Design IP blocks may comprise a variety of relatively complicated devices such as multiplexers, analog to digital (A/D) converters and the like. The devices in standard cell libraries and design IP blocks have been verified through various process characterization tests and data taken from the manufacturing line. Furthermore, standard cell libraries and design IP blocks may be integrated into leading electronic design automation (EDA) tools so that designers can reduce the rate of failure by complying with the design for manufacturing (DFM) rules in standard cell libraries and design IP blocks.

Both standard cell libraries and design IP blocks may comprise some metal oxide semiconductor (MOS) devices such as low-voltage n-type MOS devices modeled as a four-terminal device. However, when devices from standard cell libraries and design IP blocks are used in high voltage applications such as power management application, LCD driver application and the like, an n-type MOS device in high voltage applications may comprise a deep n-type well (DNW) formed between a p-type well and a p-type substrate. As a result, a pair of face-to-face diodes connected in series becomes a part of the n-type MOS device. The four-terminal MOS device model cannot be directly used to describe the electrical characteristics of the n-type MOS device comprising a pair of face-to-face diodes.

In the process of developing a new IC, a MOS device model may be used in various stages of designing the new IC such as a Simulation Program with Integrated Circuit Emphasis (SPICE) simulation stage, a Layout-Versus-Schematic (LVS) check stage or a Process Design Kit (PDK) design stage. As described above, the standard four-terminal MOS device model does not include the features of a MOS device having a special structure. Therefore, a model for multi-terminal MOS device is needed.

A dedicated multi-terminal MOS device model may be developed so that the extra terminals from the pair of face-to-face diodes can be included into the multi-terminal MOS device model. More particularly, the dedicated multi-terminal MOS device model may comprise all possible combinations in a foundry's semiconductor process. For example, there may be ten four-terminal models describing existing MOS devices provided by the foundry. The foundry may have six different types of deep n-type wells. In addition, each deep n-type well may have five different breakdown voltages. As a result, the total number of possible combinations of the above variations is 10 times 6 times 5, which comes to 300. In comparison to ten standard MOS device models provided by the foundry, the multi-terminal MOS device model approach may require extra support.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, an n-type oxide semiconductor (MOS) device having an isolation ring. The invention may also be applied, however, to a variety of standard cell libraries and design intellectual property (IP) blocks comprising the MOS device having an isolation ring.

Figure 1:
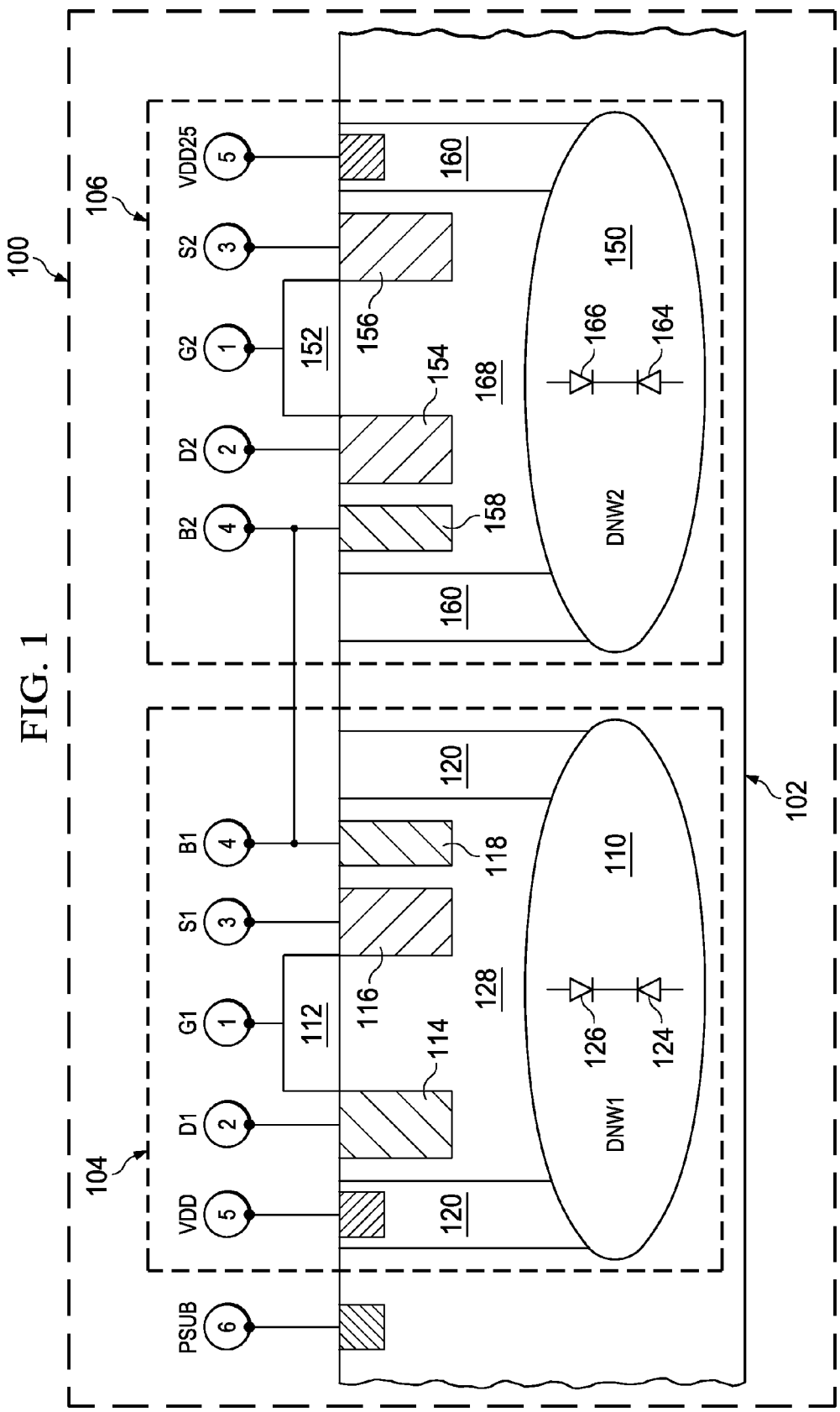
FIG. 1 illustrates two n-type metal oxide semiconductor (MOS) devices with a deep n-type well isolation structure are illustrated in accordance with an embodiment.

Referring initially to FIG. 1, two n-type MOS devices with a deep n-type well isolation structure are illustrated in accordance with an embodiment. As shown in FIG. 1, a semiconductor device 100 comprises two identical n-type MOS devices 104 and 106. Both n-type MOS devices 104 and 106 share the same semiconductor structure except an external connection terminal 5. The external connection terminal 5 of the first n-type MOS device 104 is connected to a first voltage potential VDD. In contrast, the external connection terminal 5 of the second n-type MOS device 106 is connected to a second voltage potential VDD25.

The first MOS device 104 is used as example to illustrate the nature of a MOS device having a deep n-type well isolation structure. The first MOS device 104 is formed over a p-type substrate 102. The first MOS device 104 includes a gate electrode 112, a drain region 114 and a source region 116 formed in a p-type well 128. The first MOS device 104 further includes a deep n-type well 110 formed between the p-type substrate 102 and the p-type well 128. As shown in FIG. 1, the P-type substrate 102 and the deep n-type well 110 form a first diode 124. Similarly, the p-type well 128 and the deep n-type well 110 form a second diode 126. The first diode 124 and the second diode 126 are connected face-to-face in series.

The first MOS device further includes an n-type well region 120. The n-type well 120 is a ring-shaped region formed on top of the deep n-type well 110. In addition, the top side of the first n-type well 120 is connected to the external connection terminal 5. The n-type well 120 and the deep n-type well 110 form an isolation tub so that the p-type well 128 is surrounded by n-type regions laterally and longitudinally. As a result, noise can be isolated from the p-type well 128. An advantageous feature of having an isolation tub surrounding a p-type well is that the isolation tub prevents minority charge carriers in the substrate from affecting the behavior of the n-type MOS device formed in the p-type well.

The second n-type MOS device 106 has the same structure as the first n-type MOS device. As shown in FIG. 1, the second n-type MOS device 106 includes a drain region 154, a gate electrode 152, a source region 156, an isolation tub formed by an n-type well 160 and a deep n-type well region 150. As shown in FIG. 1, the second MOS device 106 includes two face-to-face diodes 164 and 166 formed at the junctions of a p-type well 168, the deep n-type well 150 and the p-type substrate 102. Both n-type MOS devices 104 and 106 comprise a body contact. A body contact region 118 of the first MOS device 104 is connected to an external terminal 4 first and then connected to the corresponding body contact terminal of the second MOS device 106.

Figure 2:
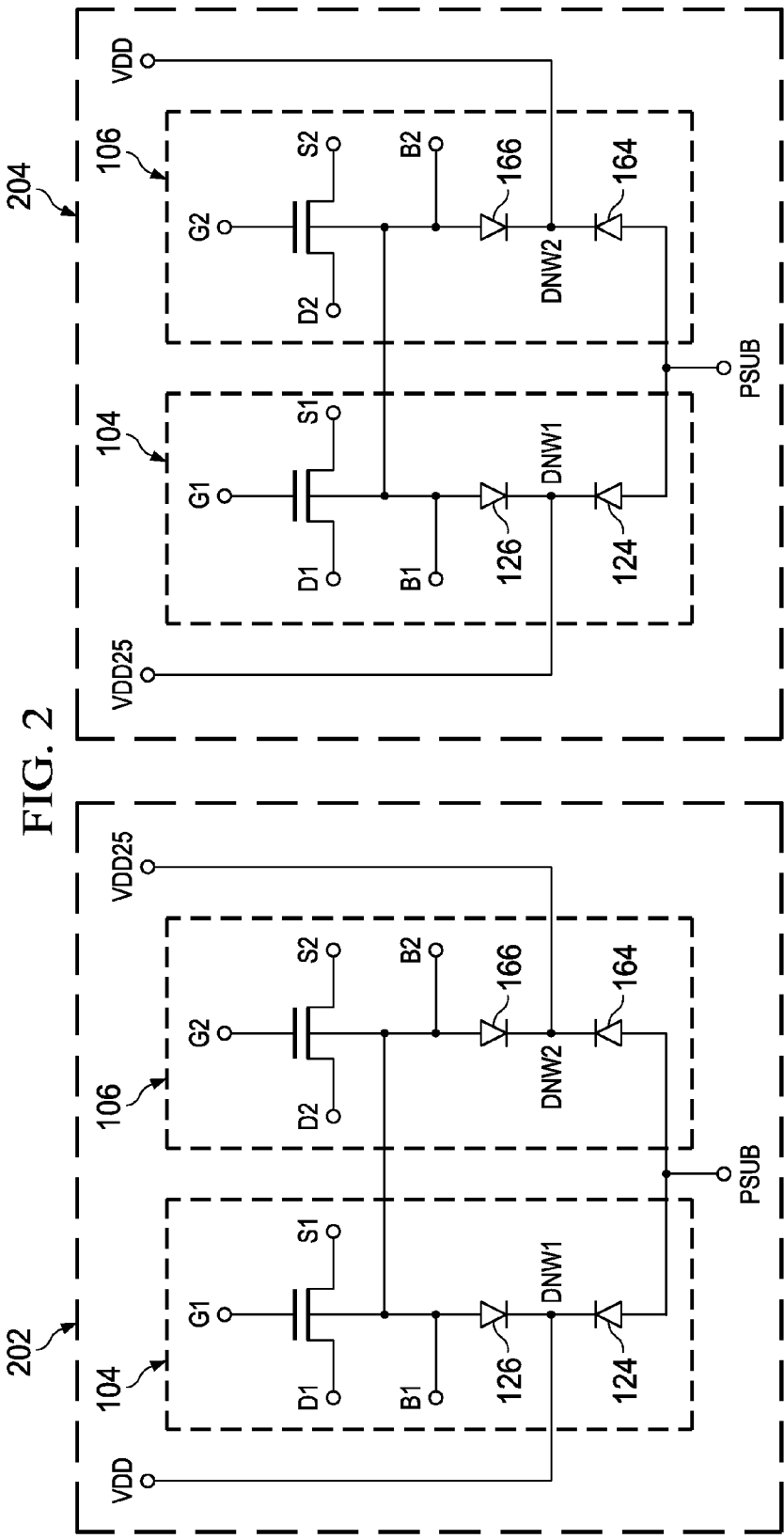
FIG. 2 illustrates two equivalent circuit diagrams of the semiconductor device 100 shown in FIG. 1.

FIG. 2 illustrates two equivalent circuit diagrams of the semiconductor device 100 shown in FIG. 1. A first circuit diagram 202 includes two n-type MOS devices 104 and 106. The first n-type MOS device 104 includes a MOS transistor having a drain D1, a gate G1, a source S1 and a pair of face-to-face diodes 124 and 126. Likewise, the second n-type MOS device 106 includes a drain D2, a gate G2, a source S2 and a pair of face-to-face diodes 164 and 166. The body contact terminals B1 and B2 are connected to each other as described with respect to FIG. 1. The first deep n-type well DNW1 is connected to VDD in accordance with an embodiment. Similarly, the second deep n-type well DNW2 is connected to VDD25.

In accordance with an embodiment, a MOS device having a pair of face-to-face diodes (e.g., the first n-type MOS device 104) can be modeled by a four-terminal MOS device model plus an isolation ring comprising a pair of face-to-face diodes. By employing this approach, a semiconductor foundry may maintain a relatively small model library in comparison to the model library based upon a multi-terminal MOS device approach. For example, in accordance with an embodiment, in a foundry's model library, there may be ten four-terminal models describing existing MOS devices in the foundry. The foundry may have six different types of deep n-type wells. In addition, each deep n-type well may have five different breakdown voltages. If the a four-terminal MOS device model plus an isolation ring approach is applicable to this foundry, the total number of models necessary to cover the variations above is 10 plus (5 times 6), which comes to 40.

An integrated circuit (IC) designer may use the model described above in the previous paragraph during different stages of the process of designing an IC. However, an inherited defect makes a model formed by a four-terminal MOS device model plus an isolation ring difficult or impossible to detect a swap between two adjacent MOS devices each having a pair of face-to-face diodes. For example, in a layout-versus-schematic (LVS) stage of designing an IC, a system based upon the model of a four-terminal MOS device model plus an isolation ring cannot differentiate the semiconductor device 202 and the semiconductor device 204. As illustrated in FIG. 2, both semiconductor devices 202 and 204 share the same structure except a swap between VDD and VDD25. The task of a LVS check is to extract devices from a layout and compare them with the schematic upon which the layout is based. The LVS check results should show whether a layout connectivity of a circuit matches the counterpart in a schematic. Because both the first n-type MOS device 104 and the second n-type MOS device 106 have the same structure, the extracted layout information from the semiconductor device 202 will be the same as that of the semiconductor device 204. In sum, this causes a defect in a LVS check.

Figure 3:
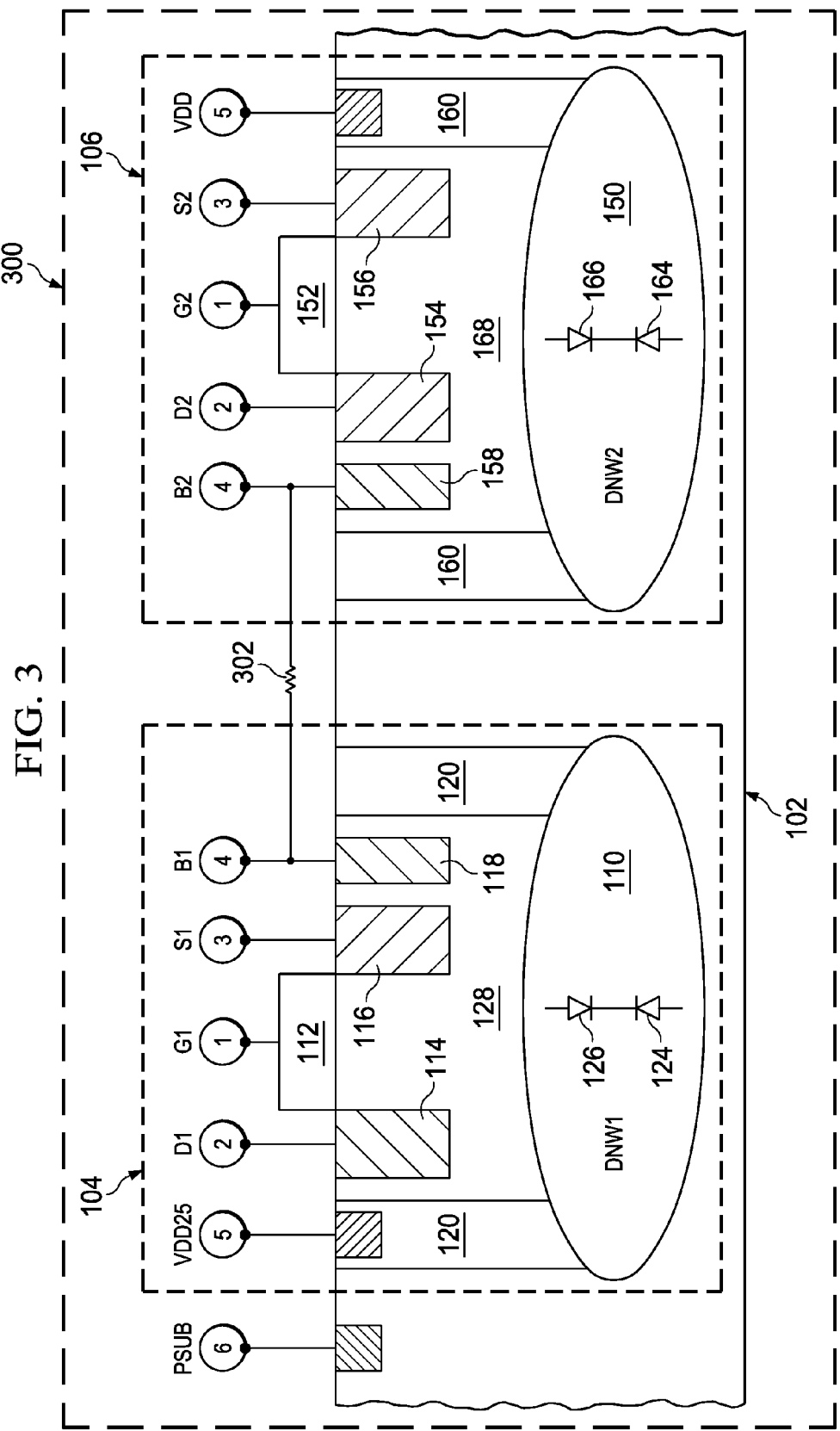
FIG. 3 illustrates a dummy device connected between two body contact terminals of two n-type MOS devices with a deep n-type well isolation structure shown in FIG. 1.

FIG. 3 illustrates a dummy device 302 connected between two body contact terminals of two n-type MOS devices with a deep n-type well isolation structure shown in FIG. 1. A semiconductor device 300 shown in FIG. 3 has the same structure as the semiconductor device 100 shown in FIG. 1. In order to address the defect in a LVS check, a dummy device 302 is connected between the body contact terminal B1 of the first n-type MOS device 104 and the body contact terminal B2 of the second n-type MOS device 106. This dummy device can be derived from the existed backend metal routing which connects between B1 and B2. Moreover, it should be noted while FIG. 3 illustrates the dummy device 302 is a single resistor, a person having ordinary skill in the art will recognize that the dummy device 302 can be a group of resistors connected in series or in parallel. While not a limitation on the scope of the presently claimed invention, it is believed that a resistor in the range of 0.001 Ohm to 999 Ohm would be preferable. It should further be noted that the resistor based dummy device is a matter of mere design choice. Any equivalent device capable of providing a differentiate factor between two body contact terminals is within the scope of the present invention. One of ordinary skill in the art would recognize many variations, alternatives, and modifications.

Figure 4:
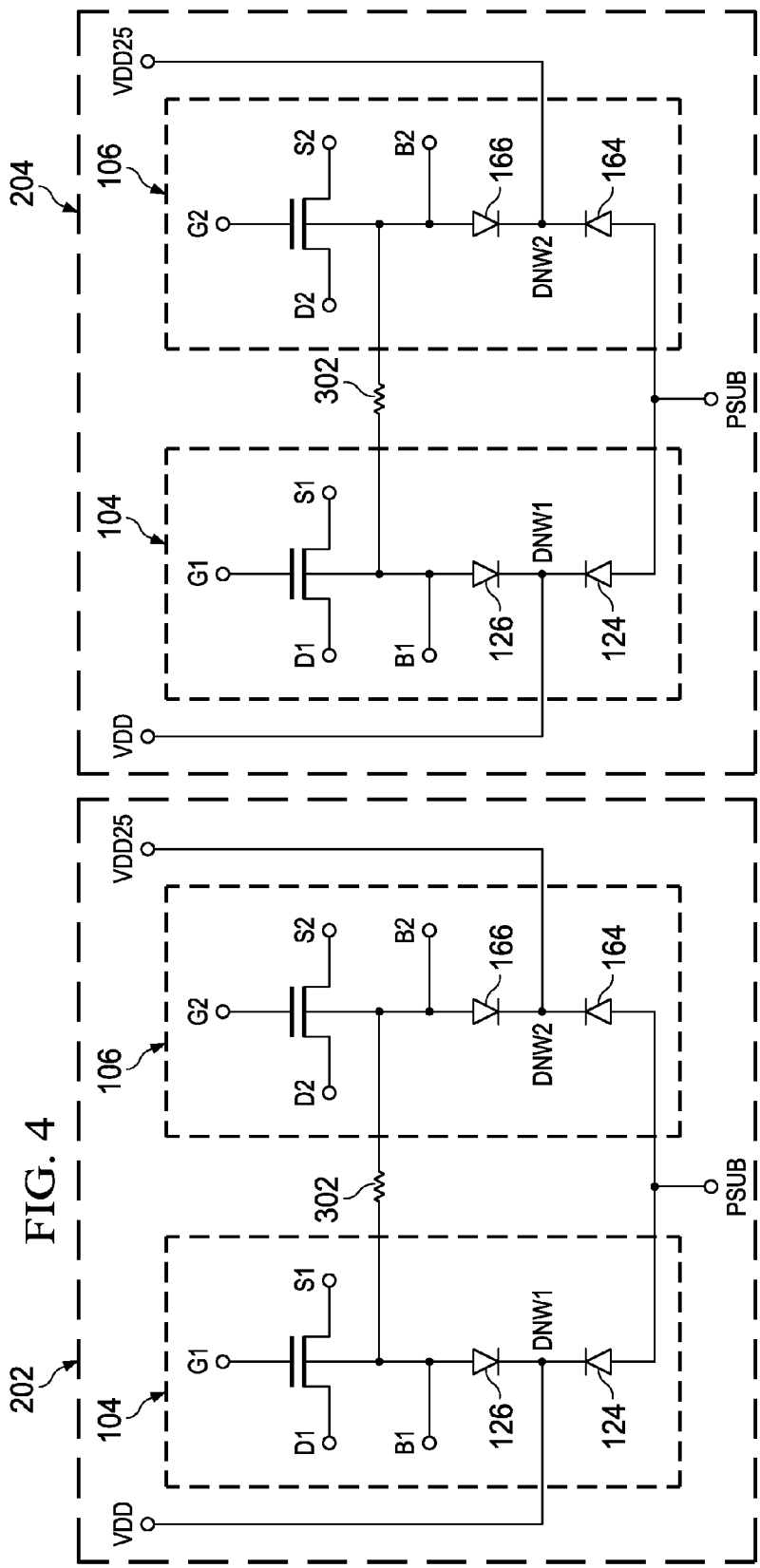
FIG. 4 illustrates two equivalent circuit diagrams of the semiconductor device 300 shown in FIG. 3.

FIG. 4 illustrates two equivalent circuit diagrams of the semiconductor device 300 shown in FIG. 3. A four terminal (4T) MOS plus an isolation ring device model is formed by combining a standard four-terminal MOS device model with an isolation ring comprising two face-to-face diodes. As described in the example with respect to FIG. 2, a foundry may only support 40 models in accordance with an embodiment. By employing this methodology, the standard four-terminal MOS device models will be reused. In addition, during SPICE simulation and LVS check stages, the foundry need only support 40 models in comparison to 300 models if a multi-terminal MOS device model is adopted for modeling a MOS device having an isolation ring.

Furthermore, in order to provide convenience to IC designers, a multi-terminal MOS device symbol is built for each combination of MOS devices and isolation rings. For example, in a foundry's LVS and SPICE models, there are ten four-terminal models describing existing MOS devices in the foundry. The foundry may have six different types of deep n-type wells. In addition, each deep n-type well may have five different breakdown voltages. In accordance with an embodiment, the total number of possible combinations of the above variations is 10 times 6 times 5, which comes to 300. All combinations (e.g., 300 in this example) will be built in the library of a process design kit (PDK) so that an IC designer can use the symbol of a MOS device having an isolation ring directly. On the other hand, in the SPICE simulation and LVS check stages, only 40 models are maintained so that total support effort is reduced.

By employing a dummy device such as a metal resistor connected between two body contact terminals (e.g., B1 and B2), a LVS check can differentiate the swap between VDD and VDD25 shown in the semiconductor devices 402 and 404. For example, in the semiconductor device 402, the layout connectivity between the body contact terminal B1 and the first voltage potential can be described as follows:

B1→Diode→VDD

In contrast, after a swap between VDD and VDD25, the extracted connectivity information from the semiconductor device 404 is different from the connectivity route shown above. The connectivity route in the semiconductor device 404 can be described as follows:

B1→R→Diode→VDD

By employing a dummy device such as a metal resistor from backend routing, the LVS check can differentiate the swap of two voltage potentials as illustrated above. An advantageous feature of adding a dummy device is that the total models for supporting a MOS device having an isolation ring is reduced while the defect in a LVS check is avoided.

FIG. 4 illustrates that a dummy device 302 is added between two body contact terminals of two identical transistors. It should be noted that the dummy device 302 is also applicable to two different transistors comprising the same isolation ring structure. It should further be noted that while FIG. 4 illustrates two n-type MOS transistors, the proposed method of employing a dummy device between two body contact terminals can be extended to standard cell libraries and design IP blocks. For example, in a system on chip (SoC) design, there may be several IP blocks having their own isolation rings. In order to differentiate a layout swap between IPs, a dummy device may be added between any two body contact terminals of the design IP blocks. As a result, a LVS check can differentiate layout swaps such as a swap of two voltage potentials.

Figure 5:
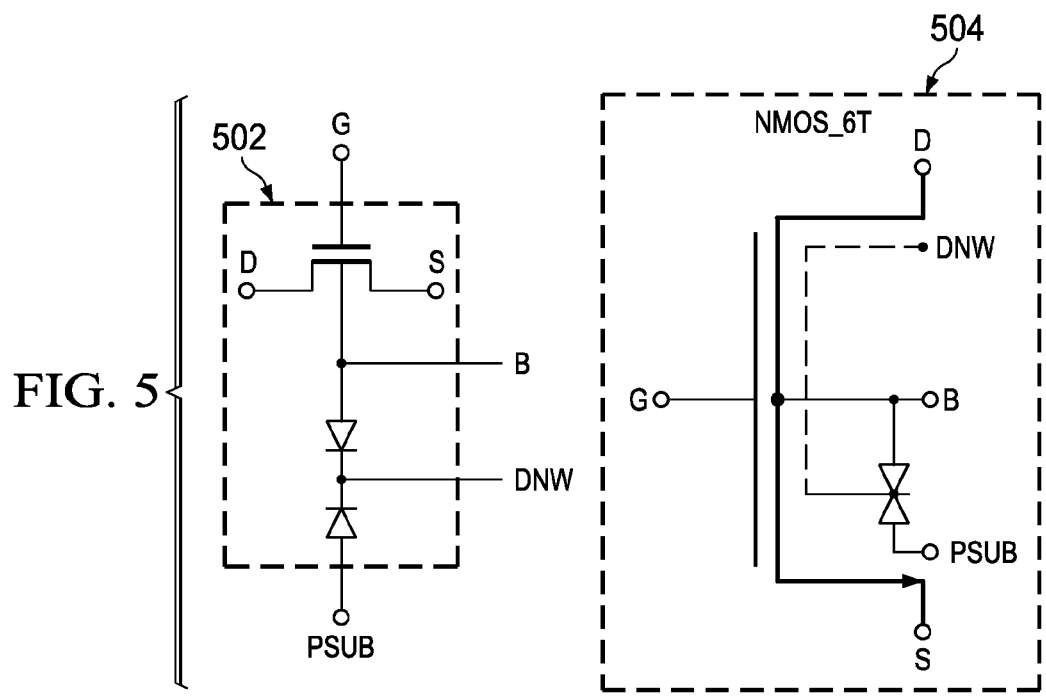
FIG. 5 illustrates a multi-terminal Process Design Kit (PDK) symbol.

FIG. 5 illustrates a multi-terminal PDK symbol. In a PDK stage of designing an IC, a multi-terminal PDK symbol 502 is provided to an IC designer so that it is not necessary for the IC designer to connect an isolation ring having a pair of face-to-face diodes with a four-terminal MOS device symbol. After the multi-terminal PDK symbol 502 is loaded into the schematic of the IC, a schematic symbol 504 is used to represent a MOS device having an isolation ring. The schematic symbol 504 comprises six terminals, namely a drain, a source, a gate, a body contact, an deep n-type well (DNW) and a p-type substrate. An advantageous feature of having a six-terminal PDK symbol representing a MOS device having an isolation ring is that an IC designer can load the six-terminal PDK symbol directly. As a result, design time and effort are reduced.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
    a first n-type metal oxide semiconductor (MOS) device comprising:
        a first drain formed on a first p-type well;
        a first gate;
        a first source formed on the first p-type well;
        a first body contact formed on the first p-type well; and
        a first deep n-type well formed between the first p-type well and a p-type substrate;
    a second n-type MOS device formed adjacent to the first n-type MOS device comprising:
        a second drain formed on a second p-type well;
        a second gate;
        a second source formed on the second p-type well;
        a second body contact formed on the second p-type well; and
        a second deep n-type well formed between the second p-type well and the p-type substrate, wherein the second deep n-type well and the first deep n-type well are separated by the p-type substrate; and
    a dummy device formed between the first body contact and the second body contact, wherein the first body contact is surrounded by a first isolation tub laterally and longitudinally and the second body contact is surrounded by a second isolation tub laterally and longitudinally, and wherein the dummy device is across the first isolation tub and the second isolation tub, and wherein the dummy device is connected to a first voltage potential through a first diode and connected to a second voltage potential through a second diode, and wherein the first voltage potential is different from the second voltage potential.

2. The apparatus of claim 1, wherein the dummy device is a resistor.

3. The apparatus of claim 1, wherein the first isolation tub is formed by a first n-type well and the first deep n-type well.

4. The apparatus of claim 3, wherein the first n-type MOS device is formed within the first isolation tub.

5. The apparatus of claim 1, wherein the second isolation tub is formed by a second n-type well and the second deep n-type well.

6. The apparatus of claim 5, wherein the second n-type MOS device is formed within the second isolation tub.

7. The apparatus of claim 1, further comprising:
    a first pair of face-to-face diodes formed in a first junction between the first p-type well and the first deep n-type well and a second junction between the first deep n-type well and the p-type substrate; and
    a second pair of face-to-face diodes formed in a third junction between the second p-type well and the second deep n-type well and a fourth junction between the second deep n-type well and the p-type substrate.

8. The apparatus of claim 1, further comprising a plurality of n-type MOS devices wherein the dummy device is formed between any two body contact terminals of the plurality of n-type MOS devices.

9. A semiconductor structure comprising:
    a p-type substrate;
    a first deep n-type well region, a first n-type well region formed on the p-type substrate;
    a first p-type well formed within a first isolation tub formed by the first deep n-type well region and the first n-type well region;
    a first drain region, a first source region and a first body contact region formed in the first p-type well;
    a first gate electrode formed over the first P-type well;
    a second deep n-type well region, a second n-type well region formed on the p-type substrate, wherein the second deep n-type well and the first deep n-type well are separated by a p-type region;
    a second p-type well formed within a second isolation tub formed by the second deep n-type well region and the second n-type well region;
    a second drain region, a second source region and a second body contact region formed in the second p-type well;
    a second gate electrode formed over the second P-type well; and
    a dummy device connected between the first body contact region and the second body contact region, wherein the dummy device is across the first isolation tub and the second isolation tub, and wherein the dummy device is connected to a first voltage potential through a first diode and connected to a second voltage potential through a second diode, and wherein the first voltage potential is different from the second voltage potential.

10. The semiconductor structure of claim 9, wherein the first n-type well is connected to the first voltage potential.

11. The semiconductor structure of claim 9, wherein the second n-type well is connected to the second voltage potential.

12. The semiconductor structure of claim 9, further comprising an external terminal connected to the p-type substrate.

13. The semiconductor structure of claim 9, wherein the dummy device is selected from the group consisting of a resistor, a plurality of resistor in series, a plurality of resistors in parallel and any combination thereof.

* * * * *